United States Patent

[11] 3,585,756

| [72] | Inventor | Wallace J. S. Johnson<br>Berkeley, Calif. |
|---|---|---|
| [21] | Appl. No. | 833,290 |
| [22] | Filed | June 16, 1969 |
| [45] | Patented | June 22, 1971 |
| [73] | Assignee | Up-Right, Inc.<br>Berkeley, Calif. |

[54] METHOD OF TRAINING VINES
5 Claims, 14 Drawing Figs.

[52] U.S. Cl. .................................................... 47/58,
56/328, 47/46
[51] Int. Cl. ........................................................ A01g 17/02
[50] Field of Search............................................ 47/58, 4, 6–
7, 46; 56/328

[56] References Cited
UNITED STATES PATENTS

| 1,436,198 | 11/1922 | Roy .............................. | 47/58 |
| 1,875,561 | 9/1932 | Cirrito ......................... | 47/58 |

FOREIGN PATENTS

| 121,617 | 11/1958 | U.S.S.R. ...................... | 47/4 |

OTHER REFERENCES
FARMERS' BULLETIN No. 471, U.S.D.A., Wash. D.C., 1924, pages 16-17 relied on, copy in Gp 337, 47-Numbered Bulletins.

*Primary Examiner*—Robert E. Bagwill
*Attorney*—Mellin, Moore and Weissenberger

ABSTRACT: A fruit-bearing cordon growing from a trunk of a vine is trained horizontally while young along a wire. After sufficient maturing, the cordon is bent adjacent the trunk into a semicircle, outwardly and upwardly from the trunk, and the end portion of the cordon is trained horizontally in the opposite direction along a higher wire. Such bent or curved portion of the cordon allows the cordon to be shaken vertically and/or horizontally for mechanical harvesting of the fruit growing therefrom.

When this cordon is to be replaced, a new cane growing from the trunk is trained horizontally from the trunk to serve as a cordon and is bent in the same manner as the old cordon, and the old cordon is then cut back to the trunk.

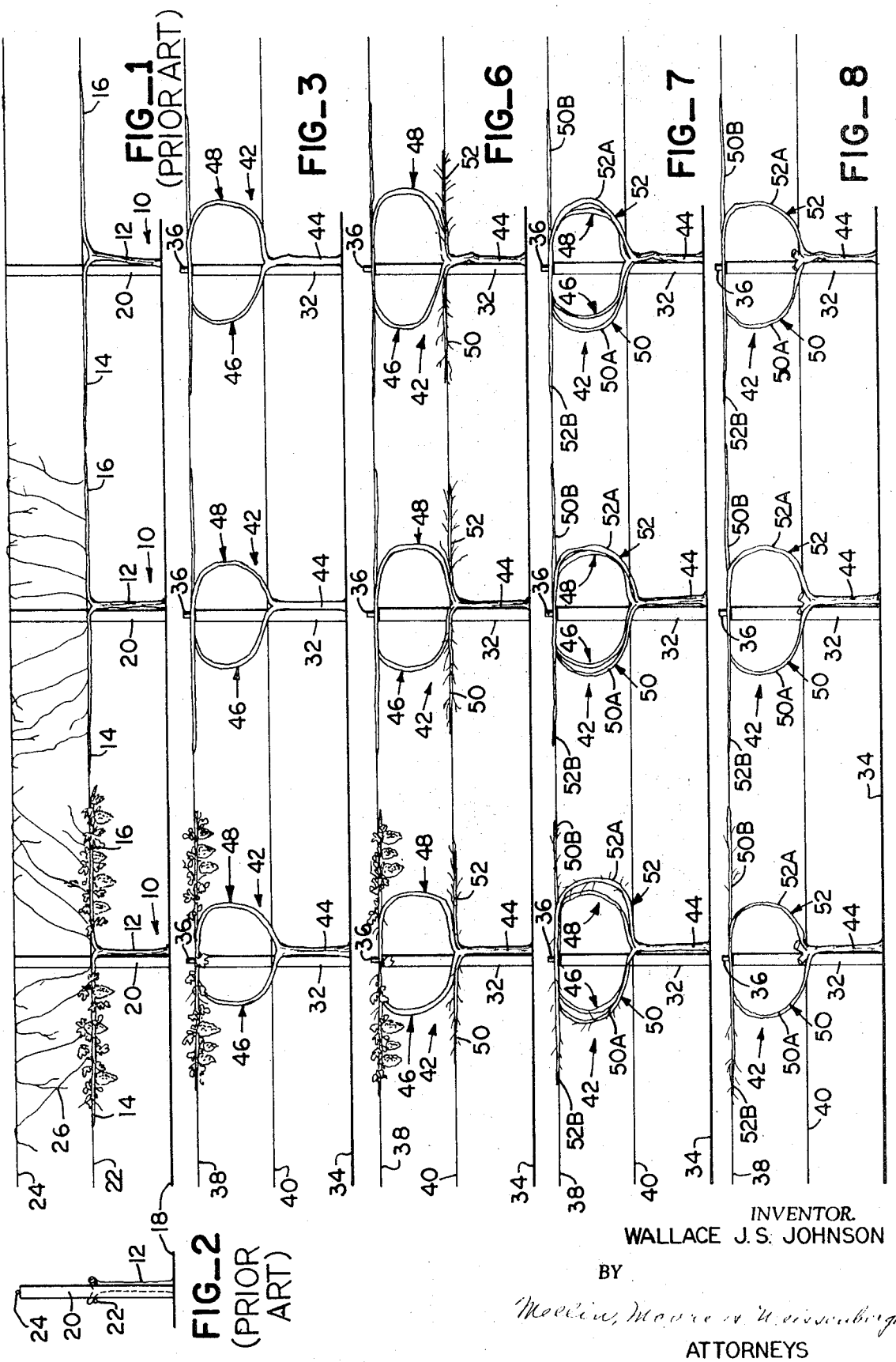

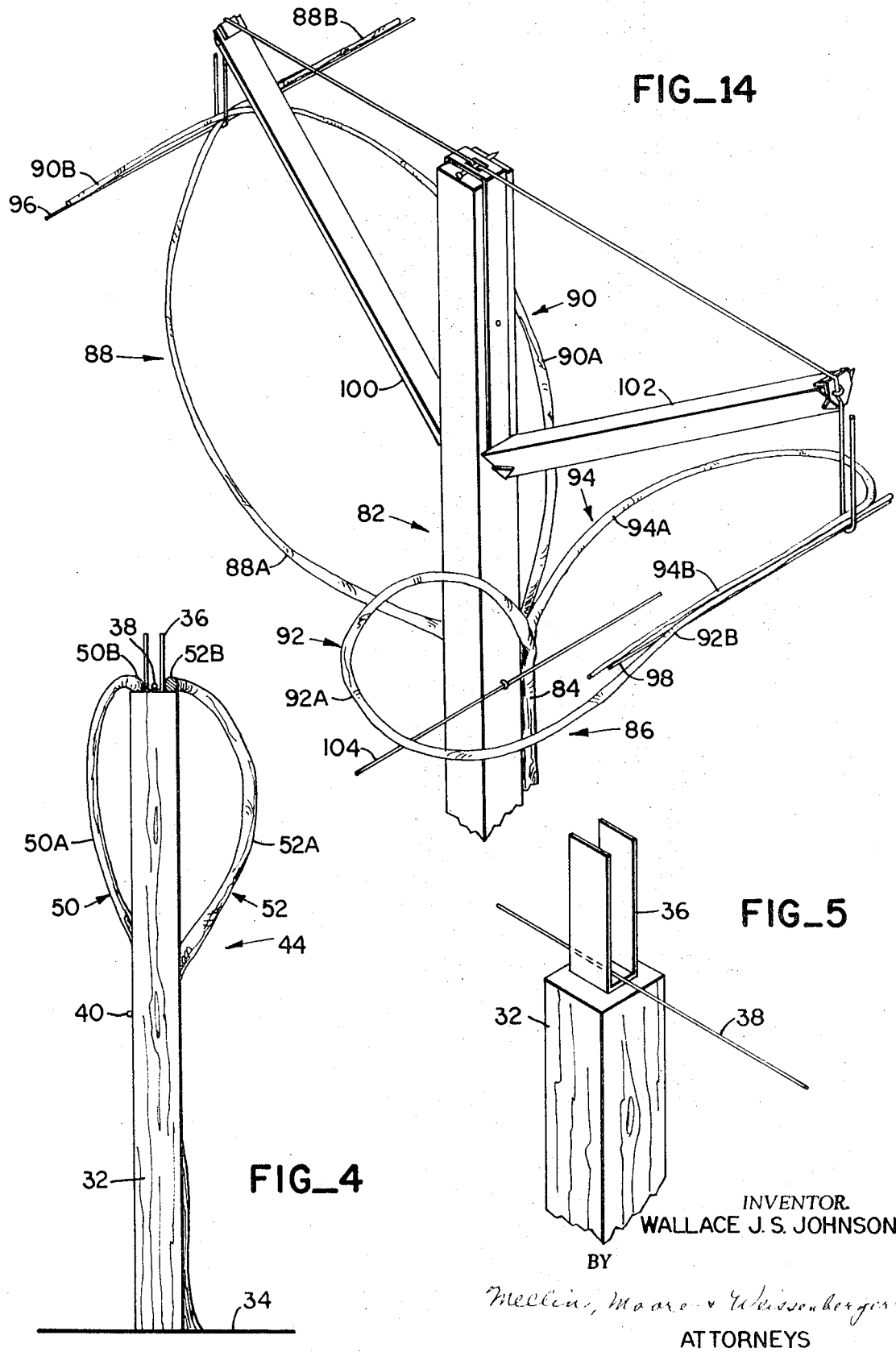

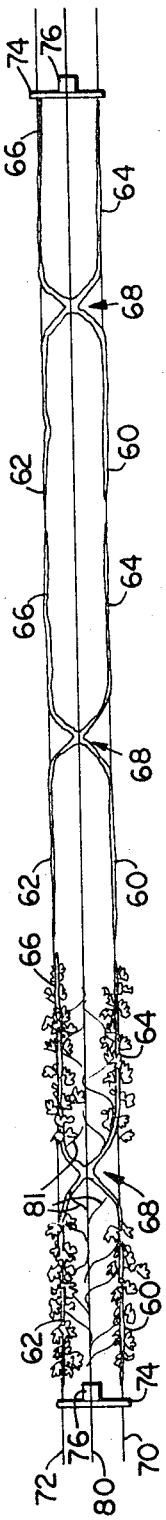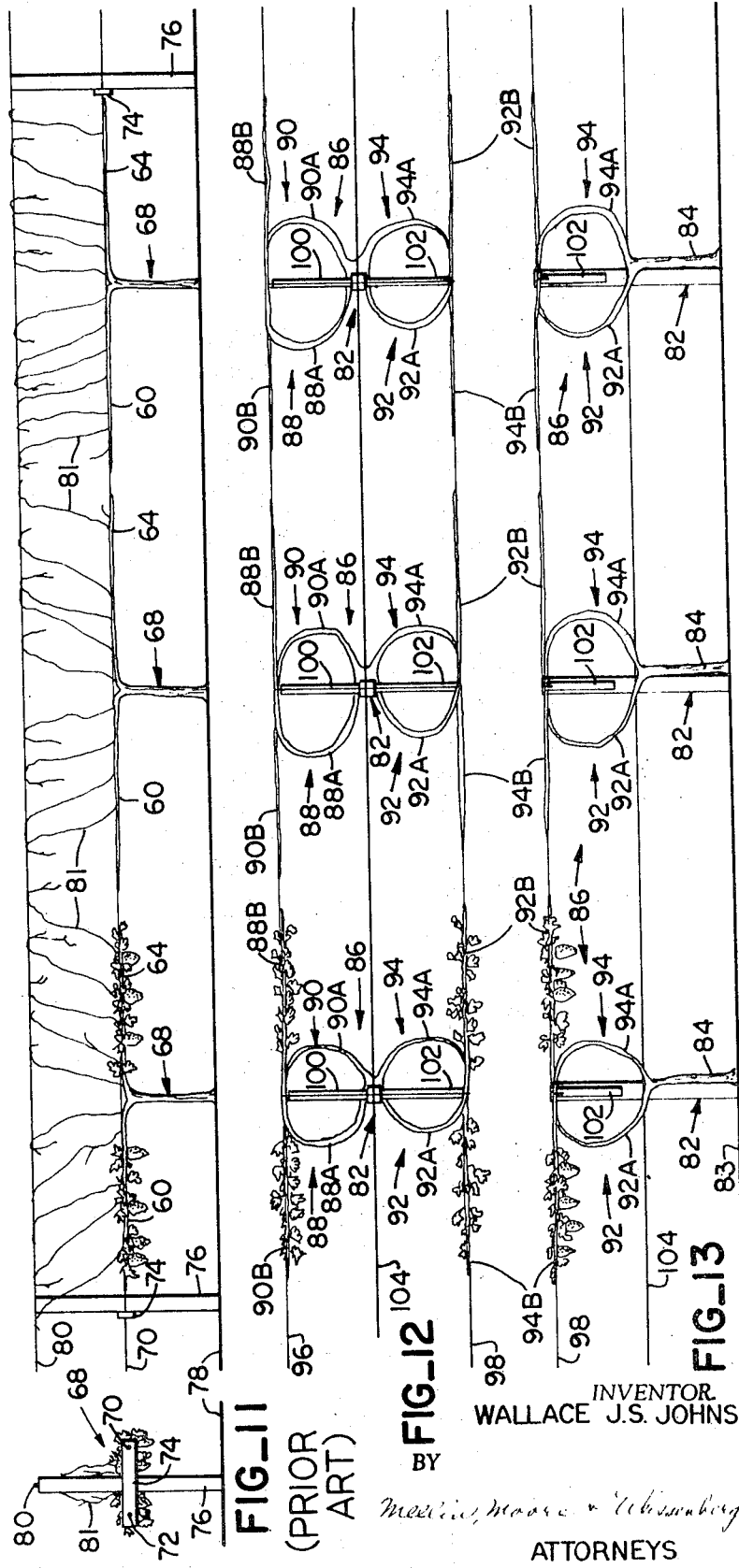

METHOD OF TRAINING VINES

BACKGROUND OF THE INVENTION

This invention relates to vine training, and, more particularly, to a method of vine training in which cordons are provided which are flexible enough to permit shaking thereof to dislodge fruit growing thereon.

Generally, there are three conventional systems of vine training: (1) head, (2) cane, and (3) cordon (or spur). In head training, the vertical trunk of the vine simply sprouts new shoots each year which grow, bear fruit, and are cut off at the trunk, to make way for new shoots the following year. Such a method is, as is well known, not suitable for mechanical harvesting.

In cane training, certain shoots or canes are selected each year to bear fruit for that harvest season. These canes may be quite long (3 feet to 12 feet), and are usually tied to wires between posts or cross arm supports in the vineyard. These canes bear fruit while replacement canes (largely devoid of fruit) are growing from the trunk of the vine. After harvest, the fruiting canes are cut off back at the trunk of the vine. Replacement canes are selected and tied to the wires for fruit bearing for the following year. All other shoots are removed from the trunk of the vine, except for a number of sprouts, which will grow the next year to provide replacement canes. Such a system of providing long, flexible canes for fruit bearing has a number of advantages: (a) Certain varieties of grapes and berries produce maximum quality and quantity of fruit when handled in this manner (e.g., Thompson Seedless, called Sultana in Australia). (b) This system is quite advantageous when the fruiting buds are out near the ends of the canes. This distributes the fruit out along the wires, for more efficient harvesting. (c) The long, flexible nature of the annually replaced fruit-bearing canes lends itself to mechanical harvesting. To remove the fruit mechanically, the canes, and the wires supporting them, must be shaken or vibrated vertically or horizontally to dislodge the fruit (as berries, clusters, or bunches, depending on the toughness of the bunch stems). These flexible fruit-bearing canes, when suitably trained on wires, will shake readily for mechanical harvesting.

Cane training, however, has a number of disadvantages, particularly when used with two-wire trellises. (a) Some vines do not have the vigor to produce replacement canes of sufficient length to be trained efficiently on the wires for fruit bearing the next year. (b) Certain varieties have the most fruitful buds on the canes near the trunk of the vine (rather than out near the ends of the canes). This causes a crowding of fruit near the trunk of the vine. (c) Vigorous vines, trellised on two or more wires that require 4, 6, 8 or 12 canes to produce the fruit potential of the vine, are expensive to prune in the winter, and to desucker and deshoot in the spring because of the sheer mass of the canes to be handled, the width of the trellised vine (making manual pruning difficult), and the number and selection of replacement canes.

In cordon training or pruning, cordons, which are actually permanent horizontal extensions of the trunk of the vine, are formed by training fruiting canes horizontally along a wire. Short fruiting canes grow out of these cordons. While the known method of cordon training overcomes to a large extent the above disadvantages of cane training, such method of cordon training has the disadvantage that it is not well suited to mechanical harvesting. This is so because the trunk of the vine is too stiff to be shaken vertically or horizontally, and the cordons (which grow thicker and stiffer each year) are too thick and stiff to be shaken effectively either vertically or horizontally.

If it is desired to convert a mature cordon-trained vine to cane training, so that the vine may be mechanically harvested, generally two seasons are required. The typical first-year loss is a significant deterrent to the vineyardist converting his cordon vineyard to cane, and the vineyardists will still be confronted with the above disadvantages of cane training.

It is the object of this invention to overcome the above-stated disadvantages of both the cane and cordon training systems by providing a system of cordon training in which the cordons are flexible enough that they can be shaken properly by a mechanical harvesting machine.

SUMMARY OF THE INVENTION

Broadly stated, the inventive flexible cordon method for training a fruiting cane from a trunk comprises growing a fruiting cane substantially horizontally from the trunk so as to form a cordon. The first or second year at pruning time this new cordon is bent upwardly and outwardly from the trunk into a semicircle and the end thereof is trained horizontally in the opposite direction.

The method further comprises the steps of growing a second fruiting cane substantially horizontally from the trunk to form a new cordon thereafter, this new cordon is bent upwardly and outwardly from the trunk into a semicircle generally coincident with the semicircular portion of the first-mentioned cordon, fixing the remaining portion of the new cordon extending from the semicircular portion thereof substantially horizontally and generally along the remaining portion of the first cordon, and cutting off the first cordon adjacent the trunk.

BRIEF DESCRIPTION OF THE DRAWINGS

These and other objects of this invention will become apparent from a study of the following specification and drawings, in which:

FIG. 1 is a side elevation of a plurality of vines having cordons trained along a single wire according to the prior art method;

FIG. 2 is an end view of one of the vines of FIG. 1;

FIG. 3 is a side elevation of a plurality of vines having cordons trained along a single wire according to the inventive method;

FIG. 4 is an end view of the vines of FIG. 3;

FIG. 5 is a perspective view of the means for supporting the single wire along which the cordons are trained;

FIGS. 6—8 are a series of views similar to that of FIG. 3, showing the training of replacement cordons;

FIG. 9 is a plan view of a plurality of vines having cordons trained along a pair of wires, according to the prior art method;

FIG. 10 is a side elevation of the vines of FIG. 9;

FIG. 11 is an end view of one of the vines of FIGS. 9 and 10;

FIG. 12 is a plan view of a plurality of vines having cordons trained along a pair of wires, according to the inventive method;

FIG. 13 is a side elevation of the vines of FIG. 12; and

FIG. 14 is a perspective view of a portion of one of the vines of FIGS. 12 and 13.

DESCRIPTION OF THE PREFERRED EMBODIMENT

Shown generally in FIGS. 1 and 2 are vines 10, each having a trunk 12 from which cordons 14, 16 are trained according to the prior art method. Each vine 10 has its trunk 12 growing upward from the ground 18 along a stake 20, to a point about 2½ feet above the ground 18. A wire 22 is stapled to each stake 20 at about this height of 2½ feet. The top of each stake 20 is set at a height of about 4½ feet above the ground 18, and a wire 24 runs along the tops of the stakes 20 and is stapled thereto.

Cordons 14, 16, which are actually permanent extensions of the trunk 12, are trained from the top of trunk 12 in opposite directions along wire 22. Annual fruiting canes 26 grow from these cordons 14, 16, and are draped over the wire 24, which helps support them.

Vines trained in the prior art manner are not suited to mechanical harvesting, it has been found. The trunks 12 of the vines 10 are too stiff to be shaken vertically or horizontally, and the cordons 14, 16 are themselves too thick and stiff to be shaken effectively either vertically or horizontally. Moreover, as the vines 10 age, the cordons 14, 16 becomes even thicker and stiffer.

The first embodiment of the inventive method is shown in FIGS. 3—8. As shown therein, a plurality of stakes 32 each extend upwardly from the ground 34. Each stake 32 has fixed to its top end a U-shaped stirrup 36 FIGS. 4 and 5). A wire 38 runs along the tops of these stakes 32 and sits in stirrups 36. A second wire 40 is stapled to each stake 32 about halfway up the stake 32. Vines 42, having trunks 44 growing upwardly from the ground 34, are associated with the stakes 32. From the top of each trunk 44 (about at the height of wire 40) are grown cordons 46, 48, trained in the inventive manner to be now described, and shown in FIGS. 6—8.

As shown therein, new fruiting canes 50, 52 are grown substantially horizontally, in opposite directions, along wire 40, from the top of trunk 44. The following year (or for a weak vine, two years later), the portions 50A, 52A of these new canes 50, 52 adjacent the trunk 44 are bent into semicircles, and the remaining portions 50B, 52B, which extend from the semicircular portions 50A, 52A, are tied to the wire 38, extending in opposite directions along the wire 38. The old cordons 46, 48, having been trained in the same manner as these fruiting canes 50, 52, are then cut off adjacent the trunk 44.

The crop of fruit now grows from these new canes 50, 52, which are now actually the new cordons. The annual shoots which bear the fruit grow each year from these cordons 50, 52. Because of semicircular or bent portions 50A, 52A, these cordons 50, 52 have sufficient flexibility to be shaken vertically and/or horizontally, so that the growing fruit can be harvested mechanically. The U-shaped stirrups 36 are of such dimension that the wire 38 and the cordons 50, 52 may be shaken vertically and/or horizontally to dislodge fruit by a mechanical harvesting machine. The bent portions 50A, 52A flex to permit the shaking action.

Year by year, the cordons 50, 52 grow thicker and stiffer as the vine 42 becomes more mature. Whenever the cordons 50, 52 become sufficiently stiff to warrant replacement, new canes are trained along the wire 40 in the same manner as were canes 50, 52, and when they are sufficiently long, are bent and positioned as previously described, so that the semicircular portions of the new canes generally coincide with the semicircular portions 50A, 52A. The remaining portions of the new canes are fixed generally along the remaining portions 50B, 52B of cordons 50, 52, and the cordons 50, 52 are then cut off adjacent the trunk.

As an alternative, if it is desired to harvest fruit off the new cordons as they are being trained, they may be trained directly along the bent portions 50A, 52A, and along the remaining portions 50B, 52B of the cordons 50, 52.

Shown generally in FIGS. 9—11 is the prior art method of training four cordons 60, 62, 64, 66 from vines 68 along two side-by-side wires 70, 72. Such wires 70, 72 are supported by crosspieces 74 mounted to stakes 76 in the ground 78, and along the tops of the stakes runs another wire 80 over which are draped the fruiting canes 81 growing from the cordons 60, 62, 64, 66. As in the previous prior art method, such cordons 60, 62, 64, 66 are too stiff to be shaken effectively either horizontally or vertically.

The second embodiment of the inventive method, as applied to two wires, is shown in FIGS. 12—14. In such embodiment, trellises 82 (FIG. 14) are provided which extend from the ground 83. The trunk 84 of vines 86 grow from the ground 83 upward, and from the top of each trunk 84 extend cordons 88, 90, 92, 94, which have semicircular portions 88A, 90A, 92A, 94A which extend upwardly and outwardly from the top of trunk 84, and remaining portions 88B, 90B, 92B, 94B which are trained horizontally along wires 96, 98 supported by arms 100, 102 of trellises 82. Such cordons 88, 90, 92, 94, and any replacement cordons, of course, have been trained by the method previously disclosed, wire 104, running from trellis to trellis, below wires 96, 98, being provided for such training.

In this embodiment, the trellises 82 are designed to permit the wires 96, 98, and the cordons 88, 90, 92, 94, to be shaken vertically and/or horizontally, to dislodge the fruit. Because the cordons 88, 90, 92, 94 curve outwardly as well as upwardly, it is possible for the mechanical shaker to get under the horizontal portions 88B, 90B, 92B 94B without coming into contact with the bent portions 88A, 90A, 92A, 94A, or in contact with the trunks 84, or in contact with any replacement canes being trained on wire 104.

Both embodiments have the distinct advantage that the height of the cordons is raised to 4 to 5 feet from the typical height of 2½ feet of the prior art, which is quite desirable for mechanical harvesting. This is done without having to deal with the major viticultural problem of raising the top end of the trunk of the vine.

The method of training vines disclosed herein has none of the disadvantages of cane training or pruning previously discussed. It has been found that both weak and vigorous vines produce efficiently by this method. Varieties having the most fruitful buds near the attached ends of the canes can produce efficiently with the fruit well distributed along the cordons. Pruning is inexpensive, because annual shoots are short and are easily removed. Replacement cordons are easily trained. There are no long and/or multiple canes to tie each year to the wires and to remove each year, and desuckering and deshooting of the trunk of the vine, and the bent portions of the cordons, is a simple manual rubbing operation. Finally, there is no conversion delay or crop loss. New, bent cordons may be trained when it is decided to switch from the prior art methods, and as soon as the new cordons are ready with sufficient fruiting buds to yield the crop potential, the old, horizontal (prior art) cordons are cut off.

Having thus described my invention, I claim:

1. A method of training grape vines which includes:
   a. forming a cordon by growing a fruiting cane substantially horizontally from the trunk of a vine;
   b. providing a horizontal support wire spaced from and capable of movement relative to said trunk;
   c. bending the cordon, while said cordon is young and flexible, to form the portion thereof adjacent said trunk generally into a semicircle;
   d. securing the cordon beyond the bent portion thereof to said horizontal support wire with the cordon extending therealong in a direction substantially opposite to the direction from which said cordon grows from said trunk.

2. A method as set forth in claim 1 and further including:
   e. forming a second cordon by growing a second fruiting cane substantially horizontally from the trunk of said vine and in a direction substantially opposite to said first cordon growing therefrom;
   f. bending said second cordon, while it is young and flexible, to form the portion thereof adjacent the trunk generally into a semicircle;
   g. securing said second cordon beyond the bent portion thereof to said horizontal support wire with the second cordon extending therealong in a direction opposite to the first cordon secured thereto.

3. A method as set forth in claim 2 and further including:
   h. providing a second horizontal support wire spaced from and capable of movement relative to said trunk and spaced laterally from and parallel to said first support wire;
   i. forming third and fourth cordons by growing third and fourth fruiting canes substantially horizontally from said trunk and in the general directions therefrom respectively, as said first and second canes respectively;
   j. bending said third and fourth cordons, while they are still young and flexible, to form the portions thereof adjacent said trunk generally into a semicircle;
   k. securing the third and fourth cordons beyond the bent portions thereof to said second support wire with the cordons extending therealong in directions substantially opposite to the directions from which they grow from said trunk.

4. A method as set forth in claim 1 and further including:

e. subsequently growing a replacement cordon substantially horizontally from said trunk in substantially the same direction therefrom as said first cordon grew;

f. bending said replacement cordon, while it is still young and flexible, to form the portion thereof adjacent said trunk generally into a semicircle;

g. securing said replacement cordon to said support wire in replacement of and in the same manner and direction as said first cordon;

h. cutting off said first cordon adjacent the trunk.

5. A method as set forth in claim 1, wherein said support wire is above the uppermost portion of said trunk.